(12) United States Patent
Liu et al.

(10) Patent No.: US 11,791,717 B2
(45) Date of Patent: Oct. 17, 2023

(54) THREE-LEVEL CONVERTING CIRCUIT, AND STARTING METHOD AND ELECTRONIC EQUIPMENT THEREOF

(71) Applicant: Shenzhen SOFARSOLAR Co., Ltd., Shenzhen (CN)

(72) Inventors: Peng Liu, Shenzhen (CN); Rong Xiao, Shenzhen (CN); Degang Yi, Shenzhen (CN)

(73) Assignee: SHENZHEN SOFARSOLAR CO., LTD., Shenzhen (CN)

( * ) Notice: Subject to any disclaimer, the term of this patent is extended or adjusted under 35 U.S.C. 154(b) by 0 days.

(21) Appl. No.: 17/993,915

(22) Filed: Nov. 24, 2022

(65) Prior Publication Data
US 2023/0283171 A1    Sep. 7, 2023

(30) Foreign Application Priority Data
Mar. 3, 2022    (CN) .......................... 202210203225.1

(51) Int. Cl.
*H02M 1/36*    (2007.01)
*H02M 3/06*    (2006.01)

(52) U.S. Cl.
CPC ............... *H02M 1/36* (2013.01); *H02M 3/06* (2013.01)

(58) Field of Classification Search
CPC .......... H02M 1/36; H02M 3/06; H02M 3/158
See application file for complete search history.

(56) References Cited

FOREIGN PATENT DOCUMENTS

| | | | | |
|---|---|---|---|---|
| CN | 110401344 A | * | 11/2019 | ............... H02M 1/32 |
| CN | 110401344 A | | 11/2019 | |
| CN | 111049383 A | * | 4/2020 | |
| CN | 112039179 A | | 12/2020 | |
| CN | 113285584 A | * | 8/2021 | ............... H02M 1/32 |
| WO | WO-2021134492 A1 | * | 7/2021 | |

* cited by examiner

*Primary Examiner* — Gary L Laxton
(74) *Attorney, Agent, or Firm* — IPRO, PLLC; Na Xu

(57) ABSTRACT

A three-level converting circuit, and a starting method and electronic equipment thereof. The circuit includes: a first voltage source; a first soft-start circuit; a first capacitor; a first switch, a second switch, a third switch and a fourth switch sequentially connected in series; a flying capacitor; a second soft-start circuit; a second voltage source and a second capacitor. The three-level converting circuit can pre-charge the flying capacitor, the first capacitor and the second capacitor when executing the starting method thereof, thereby preventing the over-voltage damage of the switches.

5 Claims, 6 Drawing Sheets

THREE-LEVEL CONVERTING CIRCUIT, AND STARTING METHOD AND ELECTRONIC EQUIPMENT THEREOF

PRIORITY CLAIM

This invention claims the benefit of and priority to the Chinese Patent Application No. 202210203225.1, filed to the Chinese patent office on Apr. 3, 2022 and entitled "Three-level Converting Circuit, and Starting Method and Electronic Equipment thereof", which is hereby incorporated by reference in its entirety.

TECHNICAL FIELD

The present invention relates to the technical field of power electronics, and in particular, relate to a three-level converting circuit, and a starting method and electronic equipment thereof.

BACKGROUND

In high-voltage power electronic equipment, in order to reduce the voltage stress on switch devices, three-level converters have been widely used, and the voltage stress on the switch devices thereof is only half of the port voltage. Among DC-DC converters, the three-level converters with a flying capacitor have attracted great attention in photovoltaic and energy storage products due to good common-mode characteristics, easy parallel connection, frequency doubling effect of inductor current ripple and many other advantages thereof.

In the process of implementing the invention, the applicant found that there was at least the following problem in the above related technologies: during the starting of the three-level converter with the flying capacitor, some switch devices risk overvoltage if the flying capacitor is not charged in advance. Among the solutions currently available, the solution of adding a charging circuit requires a certain dynamic response time for the charging circuit, and the switch devices still risk overvoltage, and the whole circuit is complicated and the cost is high. On the other hand, although the solution of directly adding a passive device to the main circuit solves the risk of overvoltage of the devices, it brings new problems such as unbalanced bus voltage.

SUMMARY

The invention provides a three-level converting circuit, and a starting method and electronic equipment thereof.

Objectives of the invention are realized by the following technical solutions.

In a first aspect, an embodiment provides a three-level converting circuit including: a first voltage source; a first soft-start circuit, having a first terminal connected to a positive terminal of the first voltage source; a first capacitor, being connected between a second terminal of the first soft-start circuit and a negative terminal of the first voltage source; a first switch, a second switch, a third switch and a fourth switch sequentially connected in series, a collector of the first switch being connected to the second terminal of the first soft-start circuit, and an emitter of the fourth switch being connected to the negative terminal of the first voltage source; a flying capacitor, being connected between a collector of the second switch and an emitter of the third switch; a second soft-start circuit; an inductor, being connected between an emitter of the second switch and a first terminal of the second soft-start circuit; a second voltage source, having a positive terminal connected to a second terminal of the second soft-start circuit; a second capacitor, being connected between the first terminal of the second soft-start circuit and a negative terminal of the second voltage source.

In some embodiments, the first soft-start circuit includes: a first relay, a first resistor and a second relay, wherein the first relay is connected in series with the first resistor and then connected in parallel with the second relay.

In some embodiments, the second soft-start circuit includes: a third relay, a second resistor and a fourth relay, wherein the third relay is connected in series with the second resistor and then connected in parallel with the fourth relay.

In some embodiments, the first relay to the fourth relay are normally-open relays.

In a second aspect, an embodiment provides a starting method of the three-level converting circuit as described in the first aspect, and the starting method includes: when the first voltage source supplies a high voltage, charging the first capacitor through the first soft-start circuit, and turning on the first switch and the fourth switch to charge the flying capacitor; acquiring a voltage value of the flying capacitor, and determining whether the voltage value of the flying capacitor is greater than a first preset threshold; if so, turning off the first switch and the fourth switch.

In a third aspect, an embodiment provides a starting method of the three-level converting circuit as described in the first aspect, and the starting method includes: when the first voltage source supplies a high voltage, charging the first capacitor through the first soft-start circuit, and turning on the first switch to charge the flying capacitor and the second capacitor; acquiring a voltage value of the flying capacitor, and determining whether the voltage value of the flying capacitor is greater than a first preset threshold; if so, turning off the first switch.

In some embodiments, the step of charging the first capacitor through the first soft-start circuit includes: turning on the first relay and turning off the second relay, so that the first voltage source supplies power to the first capacitor through the first resistor.

In some embodiments, the method further includes: acquiring a voltage value of the first capacitor, and determining whether the voltage value of the first capacitor is greater than a second preset threshold; if so, turning off the first relay and turning on the second relay.

In a fourth aspect, an embodiment provides a starting method of the three-level converting circuit as described in the first aspect, and the starting method includes: when the second voltage source supplies a high voltage, charging the second capacitor through the second soft-start circuit, and turning on the fourth switch to charge the flying capacitor and the first capacitor; acquiring a voltage value of the flying capacitor, and determining whether the voltage value of the flying capacitor is greater than a third preset threshold; if so, turning off the fourth switch.

In some embodiments, the step of charging the second capacitor through the second soft-start circuit includes: turning on the third relay in the second soft-start circuit and turning off the fourth relay, so that the second voltage source supplies power to the second capacitor through the second resistor.

In some embodiments, the method further includes: acquiring a voltage value of the second capacitor, and determining whether the voltage value of the second capacitor is greater than a fourth preset threshold; if so, turning off the third relay and turning on the fourth relay.

In a fifth aspect, an embodiment provides an electronic equipment including at least one processor; and a memory communicatively connected to the at least one processor; wherein the memory stores instructions executable by the at least one processor, and the instructions, when executed by the at least one processor, enable the at least one processor to execute the method as described above in the second aspect, the third aspect or the fourth aspect.

In a sixth aspect, an embodiment further provides a computer readable storage medium, and the computer readable storage medium stores instructions executable by a computer for enabling the computer to execute the method as described above in the second aspect, the third aspect or the fourth aspect.

In a seventh aspect, an embodiment further provides a computer program product, which includes a computer program stored on a computer readable storage medium, and the computer program includes program instructions that, when executed by a computer, enable the computer to execute the methods as described above in the second aspect, the third aspect or the fourth aspect.

BRIEF DESCRIPTION OF THE DRAWINGS

One or more embodiments are illustrated by pictures in corresponding attached drawings, and this does not constitute limitation of the embodiments. Elements/modules and steps labeled with the same reference numerals in the attached drawings represent similar elements/modules and steps, and unless otherwise stated, figures in the attached drawings do not constitute scale limitation.

DETAILED DESCRIPTION

The present invention will be described in detail hereinafter with reference to specific embodiments. The following embodiments will facilitate the further understanding of the present invention by those skilled in the art, but are not intended to limit the present invention in any way. It shall be noted that, those of ordinary skill in the art can make several modifications and improvements without departing from the concept of the present invention. All these belong to the scope claimed in the present invention.

In order to make objectives, technical solutions and advantages of the present invention clearer, the present invention will be further described in detail hereinafter with reference to attached drawings and embodiments. It shall be appreciated that, the specific embodiments described herein are only used to explain the present invention, and are not used to limit the present invention.

It shall be noted that, all features in the embodiments may be combined with each other without conflict, and all the combinations are within the scope claimed in the present invention. In addition, although functional module division is made in the schematic diagrams of the device and logical sequences are shown in the flowchart diagrams, in some cases, the steps shown or described can be executed with module division and sequences different from those in the schematic diagrams of the device and the flowchart diagrams. Furthermore, words such as "first", "second", "third" and "fourth" used herein do not limit the data and execution order, but only distinguish same or similar items with basically the same functions and effects. It shall be noted that, when an element is expressed as "connected" to another element, it may be directly connected to another element, or there may be one or more intervening elements therebetween.

Unless otherwise defined, all technical and scientific terms used in this specification have the same meanings as commonly understood by those skilled in the art of the present invention. In this specification, the terms used in the specification of the present invention are only for the purpose of describing specific embodiments, and are not intended to limit the present invention. The term "and/or" used in this specification includes any and all combinations of one or more associated items listed.

In addition, the technical features involved in various embodiments of the invention described below can be combined with each other as long as they do not conflict with each other.

Specifically, the embodiments of the invention will be further explained below with reference to the attached drawings.

First Embodiment

Figure 1:
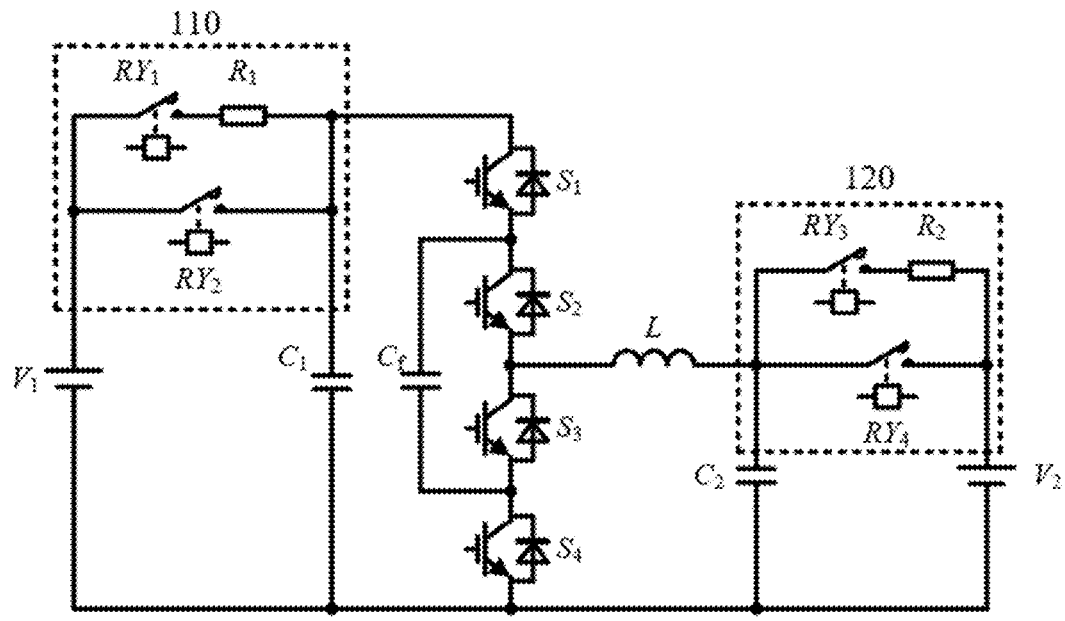
FIG. 1 is a circuit diagram of a three-level converting circuit according to a first embodiment.

This embodiment provides a three-level converting circuit. Referring to FIG. 1, which shows a circuit diagram of a three-level converting circuit according to the embodiment, the three-level converting circuit includes: a first voltage source V1; a first soft-start circuit 110; a first capacitor C1; a first switch S1, a second switch S2, a third switch S3 and a fourth switch S4 sequentially connected in series; a flying capacitor Cf; a second soft-start circuit 120; an inductor L; a second voltage source V2; and a second capacitor C2.

When the first voltage source V1 is used as the input voltage side, a high voltage is input, and the high voltage is at least a high voltage relative to the rated voltage of a switch (i.e., any of the first switch S1, the second switch S2, the third switch S3 and the fourth switch S4 with the same specifications; which applies equally to the following description), and at this time, the first voltage source V1 can output DC power.

The first soft-start circuit 110 has a first terminal connected to a positive terminal of the first voltage source V1; the first soft-start circuit 110 can charge the first capacitor C1 and the flying capacitor Cf at the starting stage of the three-level converting circuit when the first voltage source V1 supplies a high voltage, thereby realizing soft start, and preventing excessive current impact when the first voltage source V1 charges the first capacitor C1 and the flying capacitor Cf.

In some embodiments, still referring to FIG. 1, the first soft-start circuit 110 includes a first relay RY1, a first resistor R1 and a second relay RY2, and the first relay RY1 is connected in series with the first resistor R1 and then connected in parallel with the second relay RY2. In the starting stage, the series branch of the first relay RY1 and the first resistor R1 is turned on to realize soft start. After the starting of the three-level converting circuit, the branch of the second relay RY2 is turned on to realize the normal operation of the three-level converting circuit. The first resistor R1 is a soft start resistor.

In some embodiments, the first relay RY1 and the second relay RY2 are normally-open relays.

The first capacitor C1 is connected between a second terminal of the first soft-start circuit 110 and a negative terminal of the first voltage source V1, and the first capacitor C1 is used for filtering.

The first switch S1, the second switch S2, the third switch S3 and the fourth switch S4 are sequentially connected in series. Specifically, an emitter of the first switch S1 is connected to a collector of the second switch S2, an emitter of the second switch S2 is connected to a collector of the third switch S3, and an emitter of the third switch S3 is connected to a collector of the fourth switch S4. Furthermore, a collector of the first switch S1 is connected to a second terminal of the first soft-start circuit 110, and an emitter of the fourth switch S4 is connected to a negative terminal of the first voltage source V1.

The flying capacitor Cf is connected between the collector of the second switch S2 and the emitter of the third switch S3. The flying capacitor Cf is used to store energy and transfer it to a DC port (i.e., the first voltage source V1 port or the second voltage source V2 port, which applies equally to the following description). The introduction of the flying capacitor Cf can improve the common-mode characteristic of the circuit, and realize the frequency doubling effect of inductor current ripple or the like.

The second soft-start circuit 120 has a first terminal connected to the emitter of the second switch transistor S2 and connected to the collector of the third switch transistor S3. The second soft-start circuit 120 can charge the second capacitor C2 and the flying capacitor Cf at the starting stage of the three-level converting circuit when the second voltage source V2 supplies a high voltage, thereby realizing soft start, and preventing excessive current impact when the second voltage source V2 charges the second capacitor C2 and the flying capacitor Cf.

In some embodiments, still referring to FIG. 1, the second soft-start circuit 120 includes a third relay RY3, a second resistor R2 and a fourth relay RY4, and the third relay RY3 is connected in series with the second resistor R2 and then connected in parallel with the fourth relay RY4. In the starting stage, the series branch of the third relay RY3 and the second resistor R2 is turned on to realize soft start. After the starting of the three-level converting circuit, the branch of the fourth relay RY4 is turned on to realize the normal operation of the three-level converting circuit.

In some embodiments, the third relay RY3 and the fourth relay RY4 are normally-open relays.

A positive terminal of the second voltage source V2 is connected to a second terminal of the second soft-start circuit 120. When the second voltage source V2 is used as the input voltage side, a high voltage is input, and the high voltage is at least a high voltage relative to the rated voltage of the switch. At this time, the second voltage source V2 can output a DC power.

The second capacitor C2 is connected between a first terminal of the second soft-start circuit 120 and a negative terminal of the second voltage source V2, and the second capacitor C2 is used for filtering.

In some embodiments, still referring to FIG. 1, the inductor L is connected between the emitter of the second switch S2 and the first terminal of the second soft-start circuit 120, and the inductor L is used for energy storage.

The three-level converting circuit according to the embodiment shares the switch with the main circuit to provide a charging branch, and is used in cooperation with the relay in the soft-start circuit, so as to pre-charge the flying capacitor in the soft start process. Meanwhile, the DC port can also prevent excessive current impact through the soft-start circuit, thereby saving the space and cost of the equipment or module.

Second Embodiment

Figure 2:
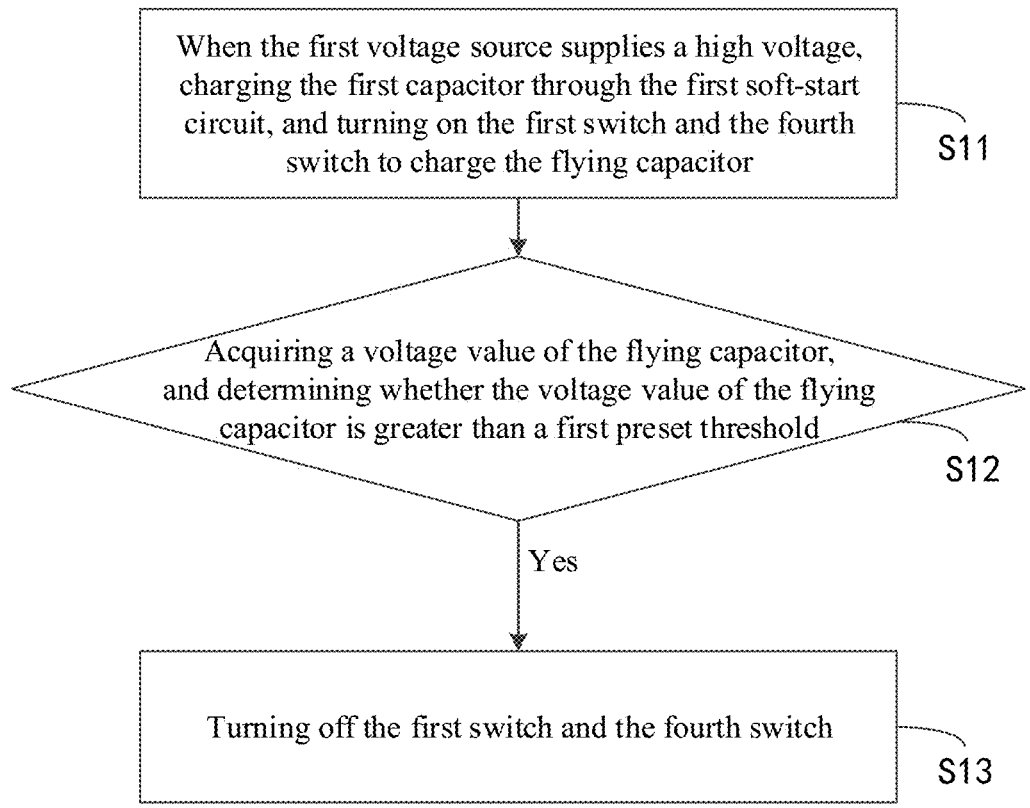
FIG. 2 is a flowchart diagram of a starting method of a three-level converting circuit according to a second embodiment.

This embodiment provides a starting method of a three-level converting circuit, and the starting method can be applied to the three-level converting circuit described in the first embodiment. Referring to FIG. 2, which shows a flowchart diagram of a starting method of the three-level converting circuit according to the embodiment, the starting method of the three-level converting circuit includes, but not limited to, the following steps:

Step S11: when the first voltage source supplies a high voltage, charging the first capacitor through the first soft-start circuit, and turning on the first switch and the fourth switch to charge the flying capacitor.

The step of charging the first capacitor through the first soft-start circuit includes: turning on the first relay and turning off the second relay, so that the first voltage source supplies power to the first capacitor through the first resistor.

Figure 3:
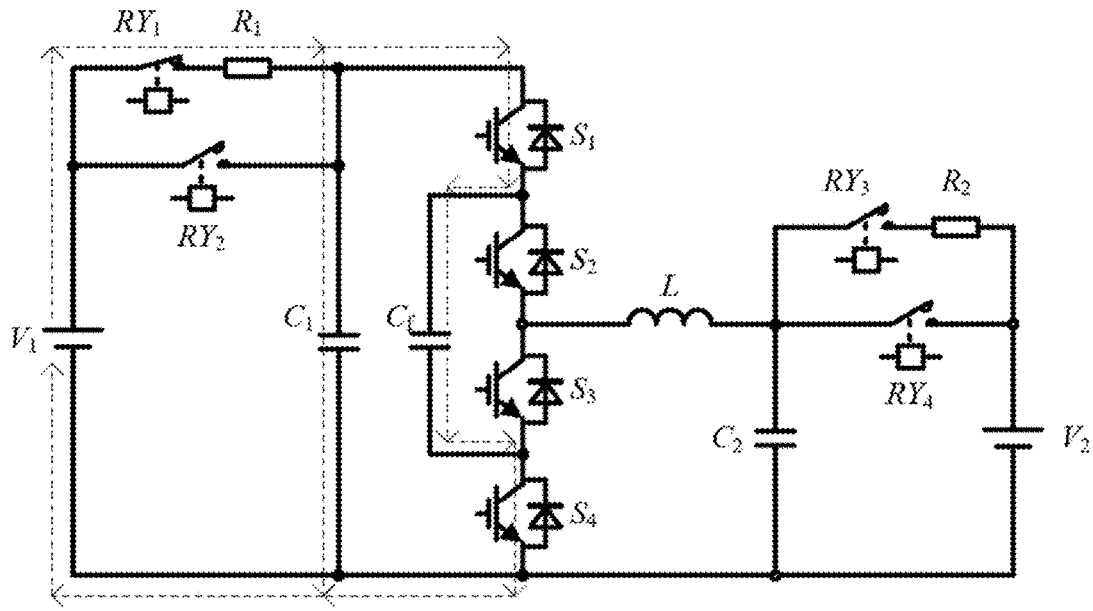
FIG. 3 is a diagram illustrating the working principle of the three-level converting circuit shown in FIG. 1 under the starting method according to the second embodiment.

Please refer to FIG. 3 together, and FIG. 3 is a diagram illustrating the working principle of the three-level converting circuit shown in FIG. 1 under the starting method according to the embodiment. The direction of the dotted arrow in FIG. 3 indicates the flow direction of the operating current. In the embodiment, when the first voltage source V1 supplies a high voltage, the first switch S1 and the fourth switch S4 are firstly turned on, and then the first relay RY1 is turned on, so that the first capacitor C1 and the flying capacitor Cf are charged simultaneously. Due to the first resistor R1, the voltages of the first capacitor C1 and the flying capacitor Cf may rise slowly.

Step S12: acquiring a voltage value of the flying capacitor, and determining whether the voltage value of the flying capacitor is greater than a first preset threshold; if so, proceeding to step S13.

In the embodiment, when it is detected that the voltage of the flying capacitor reaches the first preset threshold, the flying capacitor has a certain voltage at this time, and the first switch has no risk of overvoltage. Then, the method may proceed to step S13 to turn off the first switch and the fourth switch. The first preset threshold may be set according to the selection of the switches and the specific connection of the circuit in practical application, and for example, it may be set to be half of the first voltage source.

Step S13: turning off the first switch and the fourth switch.

In the embodiment, after the first switch and the fourth switch are turned off, the first relay is kept in an ON state so that the first voltage source continues to charge the first capacitor through the first resistor, thereby realizing soft start.

Figure 4:
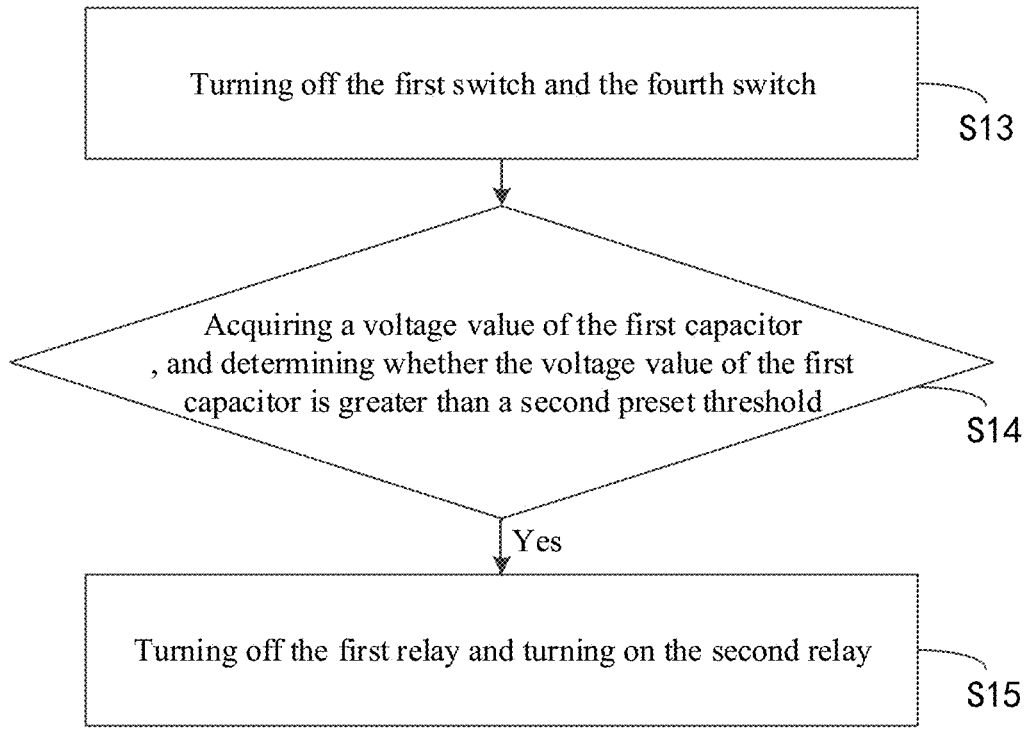
FIG. 4 is a flowchart diagram of a starting method of another three-level converting circuit according to the second embodiment.

In some embodiments, referring to FIG. 4, which shows a flowchart diagram of a starting method of another three-level converting circuit according to the embodiment, the method further includes the following steps:

Step S14: acquiring a voltage value of the first capacitor, and determining whether the voltage value of the first capacitor is greater than a second preset threshold; if so, proceeding to step S15;

Step S15: turning off the first relay and turning on the second relay.

In the embodiment, when the charging of the flying capacitor is finished and only the first capacitor is charged after the first switch and the fourth switch are turned off, it is necessary to obtain the voltage value of the first capacitor and determine whether the voltage value of the first capacitor is greater than the second preset threshold. If the first capacitor reaches the second preset threshold, then the charging of the first capacitor is finished, and the first relay is turned off and the second relay is turned on at this time to finish the starting of the three-level converting circuit. Preferably, the second preset threshold is set to be a value larger than the first preset threshold, and specifically, it may be set according to actual needs.

Third Embodiment

Figure 5:
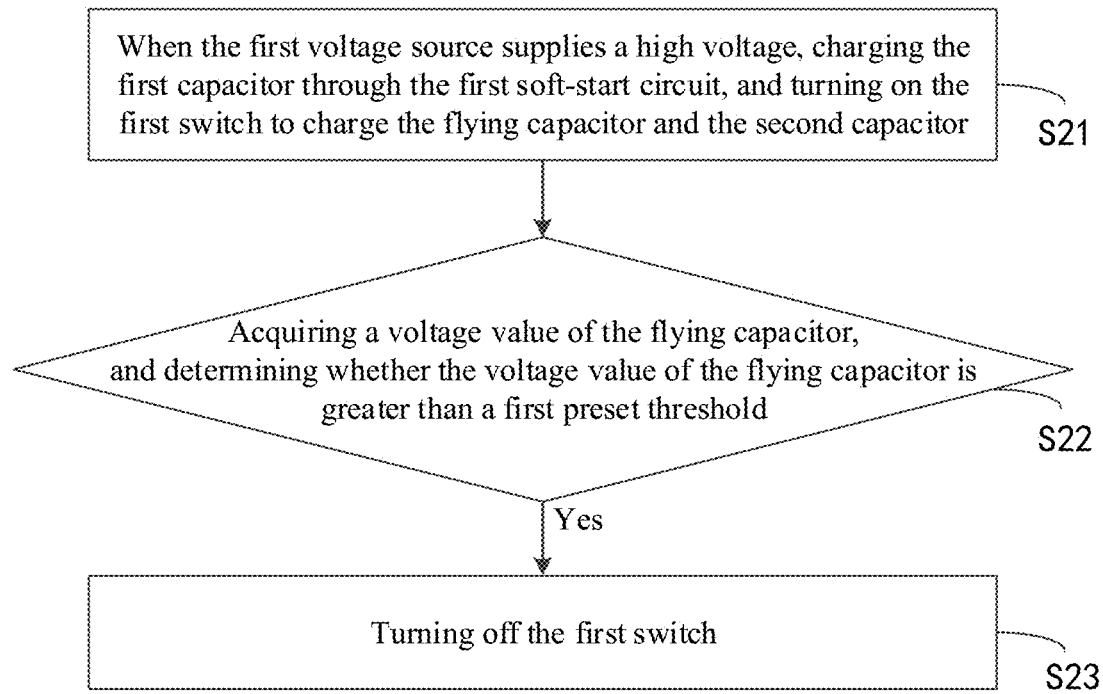
FIG. 5 is a flowchart diagram of a starting method of a three-level converting circuit according to a third embodiment.

This embodiment provides a starting method of a three-level converting circuit, and the starting method can be applied to the three-level converting circuit described in the first embodiment. Referring to FIG. 5, which shows a flowchart diagram of a starting method of a three-level converting circuit according to the embodiment, the starting method of the three-level converting circuit includes, but not limited to, the following steps:

Step S21: when the first voltage source supplies a high voltage, charging the first capacitor through the first soft-start circuit, and turning on the first switch to charge the flying capacitor and the second capacitor.

The step of charging the first capacitor through the first soft-start circuit includes: turning on the first relay and turning off the second relay, so that the first voltage source supplies power to the first capacitor through the first resistor.

Figure 6:
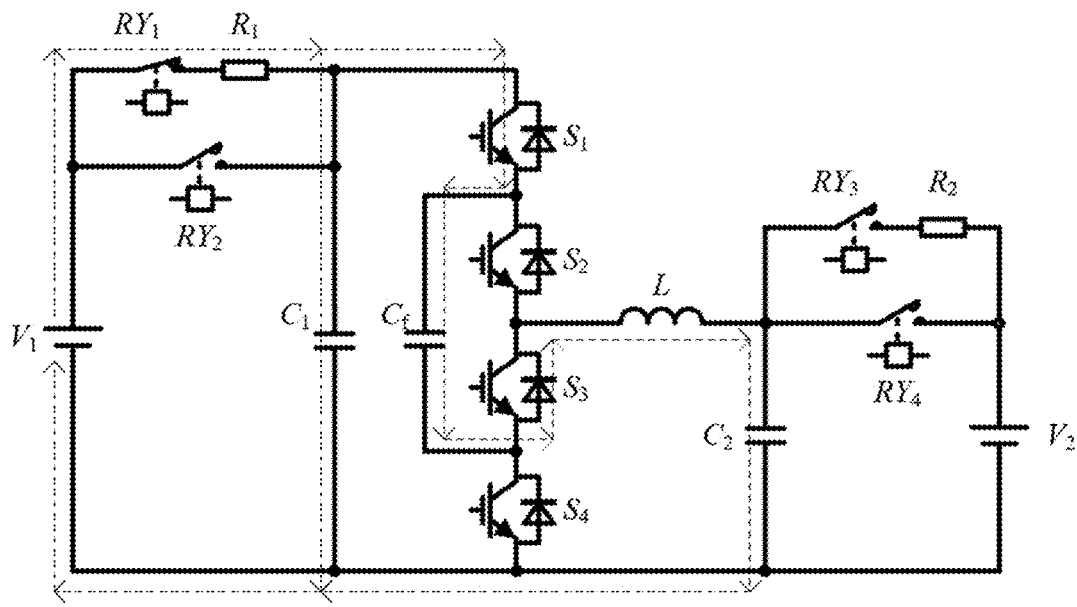
FIG. 6 is a diagram illustrating the working principle of the three-level converting circuit shown in FIG. 1 under the starting method according to the third embodiment.

Please refer to FIG. 6 together, and FIG. 6 is a diagram illustrating the working principle of the three-level converting circuit shown in FIG. 1 under the starting method according to the embodiment. The direction of the dotted arrow in FIG. 6 indicates the flow direction of the operating current. In the embodiment, when the first voltage source V1 supplies a high voltage, the first switch S1 is firstly turned on, and then the first relay RY1 is turned on, and the flying capacitor Cf and the second capacitor C2 form a series branch through the free-wheel diodes of the first switch S1 and the third switch S3. In this way, the first capacitor C1 and the flying capacitor Cf can also be charged simultaneously, and furthermore, the second capacitor C2 can be charged. Due to the first resistor R1, the voltages of the first capacitor C1 and the flying capacitor Cf may rise slowly.

Step S22: acquiring a voltage value of the flying capacitor, and determining whether the voltage value of the flying capacitor is greater than a first preset threshold; if so, proceeding to the step S23.

In the embodiment, when it is detected that the voltage of the flying capacitor reaches the first preset threshold, the flying capacitor has a certain voltage at this time, and the first switch has no risk of overvoltage. Then, the method may proceed to step S23 to turn off the first switch. The first preset threshold may be set according to the selection of the switches and the specific connection of the circuit in practical application, and for example, it may be set to be half of the first voltage source.

Step S23: turning off the first switch.

In the embodiment, after the first switch is turned off, the first relay is kept in an ON state so that the first voltage source continues to charge the first capacitor through the first resistor, thereby realizing soft start.

Figure 7:
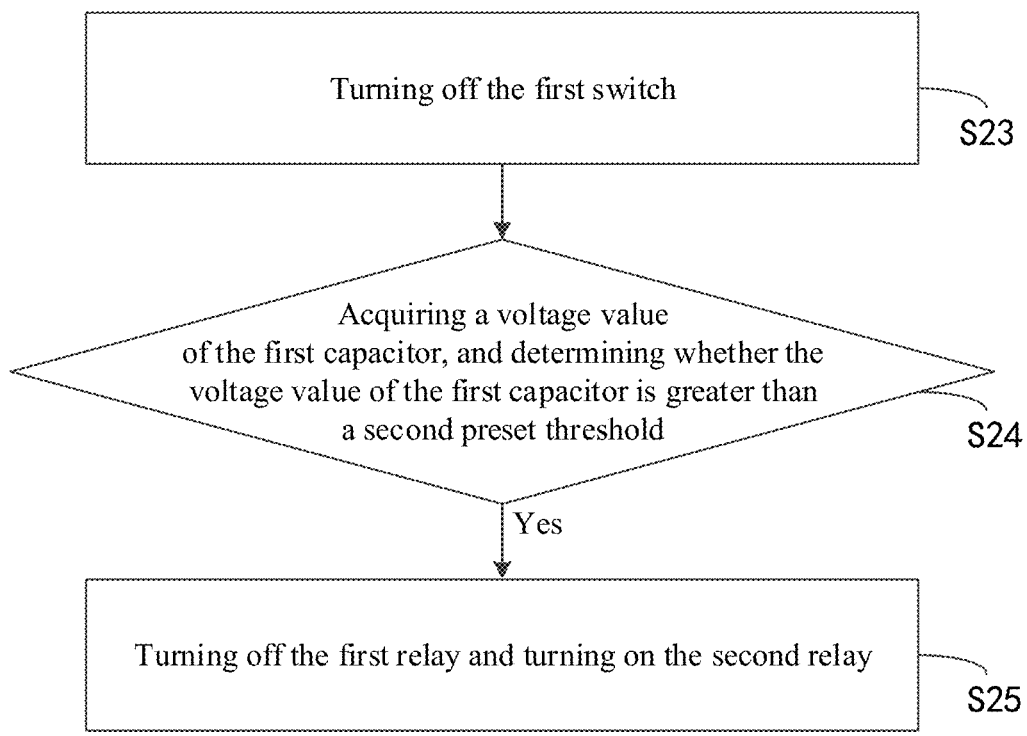
FIG. 7 is a flowchart diagram of a starting method of another three-level converting circuit according to the third embodiment.

In some embodiments, referring to FIG. 7, which shows a flowchart diagram of a starting method of another three-level converting circuit according to the embodiment, the method further includes the following steps:

Step S24: acquiring a voltage value of the first capacitor, and determining whether the voltage value of the first capacitor is greater than a second preset threshold; if so, proceeding to step S25;

Step S25: turning off the first relay and turning on the second relay.

In the embodiment, when the charging of the flying capacitor is finished and only the first capacitor is charged after the first switch is turned off, it is necessary to obtain the voltage value of the first capacitor and determine whether the voltage value of the first capacitor is greater than the second preset threshold. If the first capacitor reaches the second preset threshold, then the charging of the first capacitor is finished, and the first relay is turned off and the second relay is turned on at this time to finish the starting of the three-level converting circuit. Preferably, the second preset threshold is set to be a value larger than the first preset threshold, and specifically, it may be set according to actual needs.

Fourth Embodiment

Figure 8:
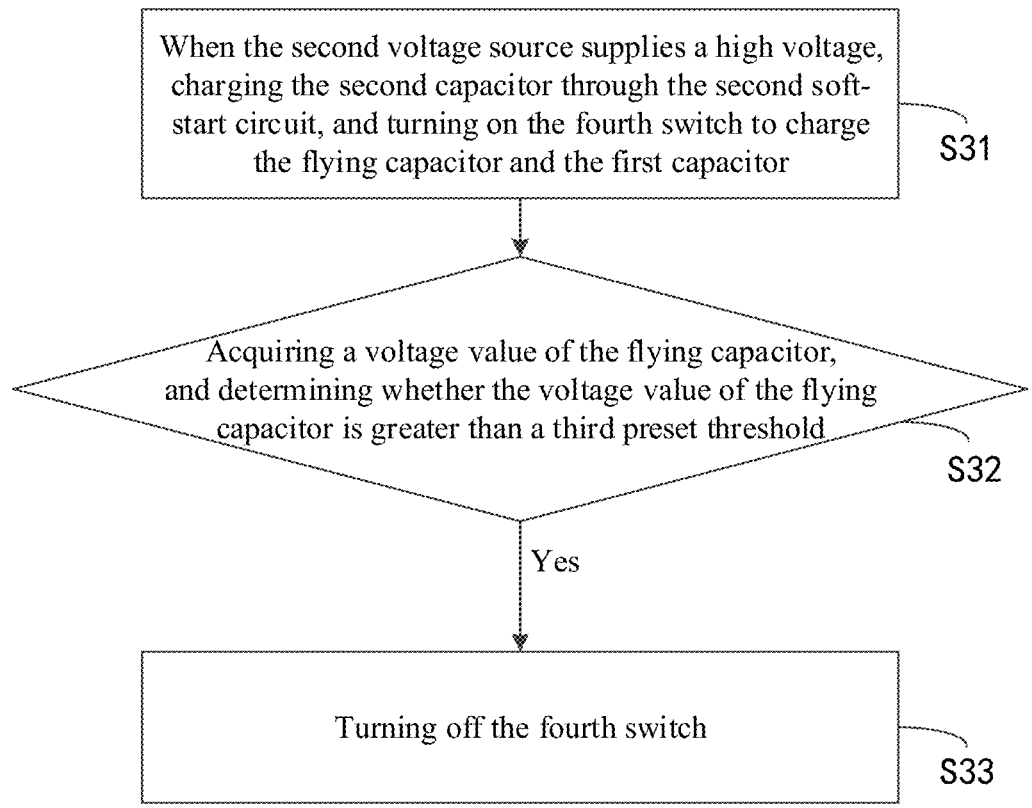
FIG. 8 is a flowchart diagram of a starting method of a three-level converting circuit according to a fourth embodiment.

This embodiment provides a starting method of a three-level converting circuit, and the starting method can be applied to the three-level converting circuit described in the first embodiment. Referring to FIG. 8, which shows a flowchart diagram of a starting method of a three-level converting circuit according to the embodiment, the starting method of the three-level converting circuit includes, but not limited to, the following steps:

Step S31: when the second voltage source supplies a high voltage, charging the second capacitor through the second soft-start circuit, and turning on the fourth switch to charge the flying capacitor and the first capacitor.

The step of charging the second capacitor through the second soft-start circuit includes: turning on the third relay in the second soft-start circuit and turning off the fourth relay, so that the second voltage source supplies power to the second capacitor through the second resistor.

Figure 9:
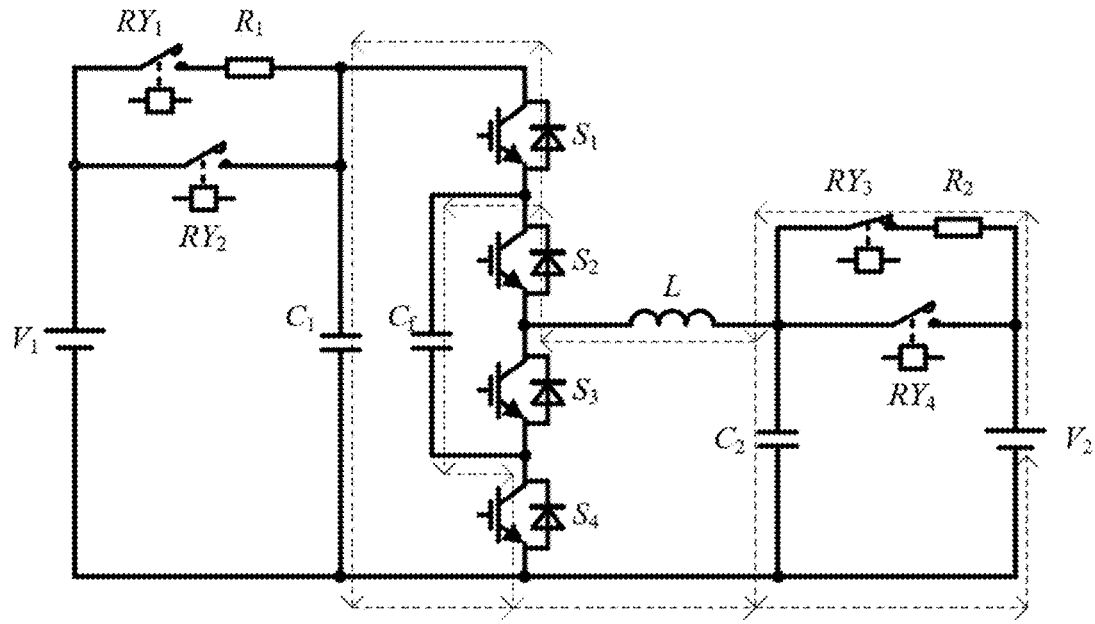
FIG. 9 is a diagram illustrating the working principle of the three-level converting circuit shown in FIG. 1 under the starting method according to the fourth embodiment.

Please refer to FIG. 9 together, and FIG. 9 is a diagram illustrating the working principle of the three-level converting circuit shown in FIG. 1 under the starting method according to the embodiment. The direction of the dotted arrow in FIG. 9 indicates the flow direction of the operating current. In the embodiment, when the second voltage source V2 supplies a high voltage, the fourth switch S4 is firstly turned on, and then the third relay RY3 is turned on, and the flying capacitor Cf, the first capacitor C1 and the second capacitor C2 form a series branch through the free-wheel diode of the first switch S1, the free-wheel diode of the second switch S2, and the fourth switch S4 so that the first capacitor C1, the second capacitor C2 and the flying capacitor Cf are charged simultaneously. Due to the second resistor R2, the voltages of the first capacitor C1, the second capacitor C2 and the flying capacitor Cf may rise slowly.

Step S32: acquiring a voltage value of the flying capacitor, and determining whether the voltage value of the flying capacitor is greater than a third preset threshold; if so, proceeding to step S33.

In the embodiment, when it is detected that the voltage of the flying capacitor reaches the third preset threshold, the flying capacitor has a certain voltage at this time, and the fourth switch has no risk of overvoltage. Then, the method may proceed to step S33 to turn off the fourth switch. The third preset threshold may be set according to the selection of the switches and the specific connection of the circuit in practical application, and for example, it may be set to be half of the second voltage source.

Step S33: turning off the fourth switch.

In the embodiment, after the fourth switch is turned off, the third relay is kept in an ON state so that the second voltage source continues to charge the second capacitor through the second resistor, thereby realizing soft start.

Figure 10:
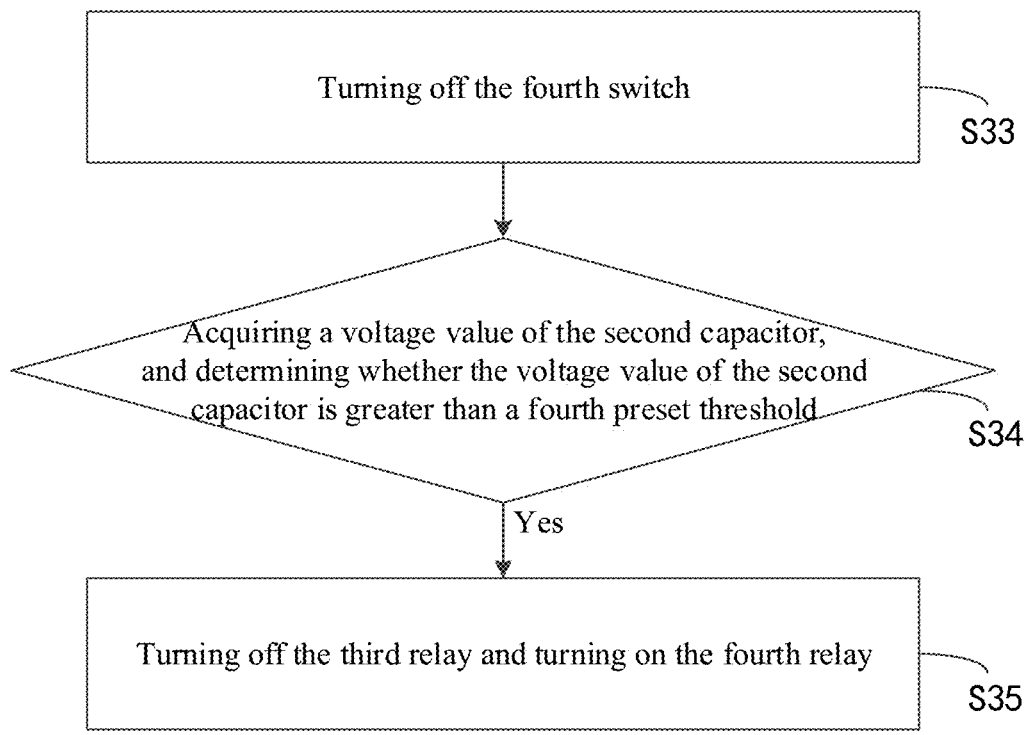
FIG. 10 is a flowchart diagram of a starting method of another three-level converting circuit according to the fourth embodiment.

In some embodiments, referring to FIG. 10, which shows a flowchart diagram of a starting method of another three-level converting circuit according to the embodiment, the method further includes steps of:

Step S34: acquiring a voltage value of the second capacitor, and determining whether the voltage value of the second capacitor is greater than a fourth preset threshold; if so, proceeding to step S35;

Step S35: turning off the third relay and turning on the fourth relay.

In the embodiment, when the charging of the flying capacitor is finished and only the second capacitor is charged after the fourth switch is turned off, it is necessary to obtain the voltage value of the second capacitor and determine whether the voltage value of the second capacitor is greater than the fourth preset threshold. If the second capacitor reaches the fourth preset threshold, then the charging of the second capacitor is finished, and the third relay is turned off and the fourth relay is turned on at this time to finish the starting of the three-level converting circuit. Preferably, the fourth preset threshold is set to be a value larger than the third preset threshold, and specifically, it may be set according to actual needs.

Fifth Embodiment

Figure 11:
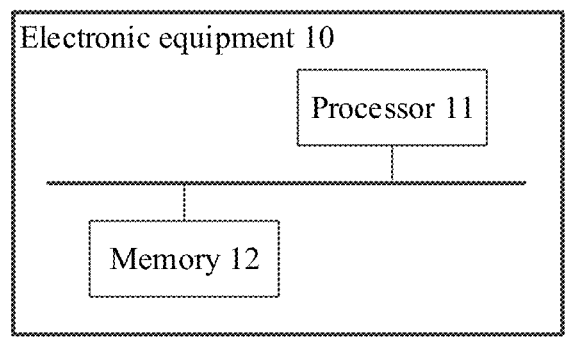
FIG. 11 is a hardware structural diagram of an electronic equipment according to a fifth embodiment.

This embodiment further provides an electronic equipment. Please refer to FIG. 11, and FIG. 11 shows the hardware structure of an electronic equipment 10 capable of executing the starting method described in the second embodiment, the third embodiment or the fourth embodiment.

The electronic equipment 10 includes: at least one processor 11; and a memory 12 communicatively connected to the at least one processor 11. One processor 11 is taken as an example in FIG. 11. The processor 11 may be connected to the first switch S1, the second switch S2, the third switch S3, the fourth switch S4, the first soft-start circuit 110 and the second soft-start circuit 120 in the three-level converting circuit described in the first embodiment, and it may control the switch devices to be turned on by outputting a driving signal from the driving module. Specifically, the process 11 may also be connected to the first relay RY1, the second relay RY2, the third relay RY3 and the fourth relay RY4.

The memory 12 stores instructions that can be executed by the at least one processor 11, and the instructions are executed by the at least one processor 11 to enable the at least one processor 11 to execute the starting method described above in FIG. 2 to FIG. 10. The processor 11 and the memory 12 may be connected by a bus or by other means, and the connection by a bus is taken as an example in FIG. 11.

As a nonvolatile computer readable storage medium, the memory 12 may be used to store nonvolatile software programs, nonvolatile computer executable programs and modules, such as program instructions/modules corresponding to the starting methods in the embodiments of the invention. The processor 11 executes various functional applications and data processing of the electronic equipment 10, i.e., implement the starting method provided by the above embodiments of the method, by running the nonvolatile software programs, instructions and modules stored in the memory 12.

The memory 12 may include a program storage area and a data storage area, wherein the program storage area may store operating systems and application programs required by at least one function; and the data storage area may store data created according to the use of the starting device or the like. In addition, the memory 12 may include a high-speed random access memory, and may also include a nonvolatile memory, such as at least one magnetic disk memory device, flash memory device, or other nonvolatile solid-state memory device. In some embodiments, the memory 12 optionally includes memories remotely provided relative to the processor 11, and these remote memories may be connected to the starting device through a network. Examples of the above network include, but not limited to, the Internet, Intranet, local area networks, mobile communication networks and combinations thereof.

The one or more modules are stored in the memory 12, and when executed by the one or more processors 11, the one or more modules execute the starting method in any of the embodiments of the methods described above, e.g., execute the steps of the methods of FIG. 2 to FIG. 10 described above.

The products described above may execute the methods provided according to the embodiments of the invention, and have corresponding functional modules and beneficial effects for executing the methods. For technical details not described in detail in this embodiment, please refer to the method provided according to the embodiments of the invention.

An embodiment further provides a nonvolatile computer readable storage medium, in which computer executable instructions are stored. The computer executable instructions are executed by one or more processors to execute the steps of the methods of FIG. 2 to FIG. 10 described above.

An embodiment further provides a computer program product, which includes a computer program stored on a nonvolatile computer readable storage medium. The computer program includes program instructions which, when executed by a computer, enable the computer to execute the starting method in any of the embodiments of the methods described above, e.g., execute the steps of the methods of FIG. 2 to FIG. 10 described above.

Embodiments of the invention provide a three-level converting circuit, and a starting method and electronic equipment thereof. The circuit includes: a first voltage source; a first soft-start circuit; a first capacitor; a first switch, a second switch, a third switch and a fourth switch sequentially connected in series; a flying capacitor; a second soft-start circuit; a second voltage source and a second capacitor. The three-level converting circuit provided according to the embodiments of the invention can pre-charge the flying capacitor, the first capacitor and the second capacitor when executing the starting method thereof, thereby preventing the over-voltage damage of the switches.

It shall be noted that, the embodiments of the devices described above are only for illustrative purpose. The units illustrated as separate components may be or may not be physically separated, and components displayed as units may be or may not be physical units. That is, these units and components may be located in one place or distributed over multiple network units. Some or all of the modules may be selected according to actual needs to achieve the purpose of the solution of the embodiment.

From the description of the above embodiments, those of ordinary skill in the art may clearly appreciate that each embodiment may be realized by means of software plus a general hardware platform, and of course, it may also be realized by hardware. As shall be appreciated by those of ordinary skill in the art, the implementation of all or part of the processes in the embodiments of the methods described above may be completed by instructing related hardware through a computer program, and the program may be stored in a computer readable storage medium. When it is executed, the program may include the processes of the embodiments of the methods described above. The storage medium may be a magnetic disk, an optical disk, a Read-Only Memory (ROM) or a Random Access Memory (RAM) or the like.

Finally, it shall be noted that, the above embodiments are only used to illustrate the technical solutions of the present invention, and are not intended to limit the present invention. Under the idea of the present invention, technical features in the above embodiments or different embodiments may also be combined, the steps may be implemented in any order, and many other variations in different aspects of the present invention as described above are possible, and these variations are not provided in details for conciseness. Although the present invention has been described in detail with reference to the foregoing embodiments, those of ordinary skill in the art shall appreciate that, the technical solutions described in the foregoing embodiments may still be modified or some of the technical features may be equivalently replaced. These modifications or replacements do not make the essence of the corresponding technical solutions deviate from the scope of the technical solutions of various embodiment of the present invention.

What is claimed is:

1. A starting method of three-level converting circuit, wherein the three-level converting circuit comprises a first voltage source, a first soft-start circuit, a first capacitor, a first switch, a second switch, a third switch, a fourth switch, a flying capacitor, a second soft-start circuit, an inductor, a second voltage source and a second capacitor;

wherein a positive terminal of the first voltage source is connected to a first terminal of the first soft-start circuit, the first capacitor is connected between a second terminal of the first soft-start circuit and a negative terminal of the first voltage source, a positive terminal of the second voltage source is connected to a second terminal of the second soft-start circuit, the second capacitor is connected between the first terminal of the second soft-start circuit and a negative terminal of the second voltage source;

wherein an emitter of the first switch is connected to a collector of the second switch, an emitter of the second switch is connected to a collector of the third switch, an emitter of the third switch is connected to a collector of the fourth switch, a collector of the first switch is connected to the second terminal of the first soft-start circuit, an emitter of the fourth switch is connected to the negative terminal of the first voltage source, the flying capacitor is connected between a collector of the second switch and an emitter of the third switch, the inductor is connected between an emitter of the second switch and a first terminal of the second soft-start circuit;

wherein the starting method comprises:

when the second voltage source supplies a high voltage, charging the second capacitor through the second soft-start circuit, and turning on the fourth switch to charge the flying capacitor and the first capacitor; wherein the first capacitor and the second capacitor form a series branch through a free-wheel diode of the first switch, a free-wheel diode of the second switch, and the fourth switch so that the first capacitor, the second capacitor and the flying capacitor are charged simultaneously;

acquiring a voltage value of the flying capacitor, and determining whether the voltage value of the flying capacitor is greater than a third preset threshold;

in response to the voltage value of the flying capacitor greater than a third preset threshold, turning off the fourth switch;

wherein the second soft-start circuit comprises a third relay, a second resistor and a fourth relay, wherein the third relay is connected in series with the second resistor and then connected in parallel with the fourth relay, the third relay and the fourth relay are normally-open relays;

wherein the step of charging the second capacitor through the second soft-start circuit comprises:

turning on the third relay in the second soft-start circuit and turning off the fourth relay, so that the second voltage source supplies power to the second capacitor through the second resistor;

wherein the step of when the second voltage source supplies a high voltage, charging the second capacitor through the second soft-start circuit, and turning on the fourth switch to charge the flying capacitor and the first capacitor further comprises:

when the second voltage source supplies a high voltage, firstly turning on the fourth switch, and then turning on the third relay to charge the flying capacitor, the first capacitor and the second capacitor form a series branch through the free-wheel diode of the first switch, the free-wheel diode of the second switch and the fourth switch, so that the first capacitor, the second capacitor and the flying capacitor are charged simultaneously.

2. The method according to claim 1, wherein the method further comprises:

acquiring a voltage value of the first capacitor, and determining whether the voltage value of the first capacitor is greater than a second preset threshold;

in response to the voltage value of the first capacitor greater than the second preset threshold, turning off the first relay and turning on the second relay.

3. The method according to claim 1, wherein the starting method further comprises:

when the first voltage source supplies a high voltage, charging the first capacitor through the first soft-start circuit, and turning on the first switch to charge the flying capacitor and the second capacitor through the first switch and a free-wheel diode of the third switch;

acquiring a voltage value of the flying capacitor, and determining whether the voltage value of the flying capacitor is greater than a first preset threshold;

in response to the voltage value of the flying capacitor greater than the first preset threshold, turning off the first switch.

4. The method according to claim 3, wherein the first soft-start circuit comprises a first relay, a first resistor and a second relay, wherein the first relay is connected in series with the first resistor and then connected in parallel with the second relay; the first relay and the second relay are normally-open relays;

wherein the step of charging the first capacitor through the first soft-start circuit comprises:

turning on the first relay and turning off the second relay, so that the first voltage source supplies power to the first capacitor through the first resistor.

5. The method according to claim 4, wherein the method further comprises:

acquiring a voltage value of the first capacitor, and determining whether the voltage value of the first capacitor is greater than a second preset threshold;

in response to the voltage value of the first capacitor greater than the second preset threshold, turning off the first relay and turning on the second relay.

* * * * *